United States Patent [19]

George, Jr. et al.

[11] Patent Number: 4,719,987

[45] Date of Patent: Jan. 19, 1988

[54] BI-PLANAR PONTOON PARAVANE SEISMIC SOURCE SYSTEM

[75] Inventors: Robert K. George, Jr., Lewisville; Lorton E. Trent, Richardson; Ernest R. Harrison, Plano, all of Tex.

[73] Assignee: Texas Instruments Incorporated, Dallas, Tex.

[21] Appl. No.: 29,377

[22] Filed: Mar. 23, 1987

Related U.S. Application Data

[63] Continuation of Ser. No. 622,307, Jun. 19, 1984, abandoned.

[51] Int. Cl.$^4$ .............................................. G01V 1/38
[52] U.S. Cl. .................................. 181/114; 181/118; 181/120; 367/17; 367/130
[58] Field of Search ........................ 367/15–17, 367/19, 130, 144; 181/110, 111, 114, 118, 120; 114/246, 253

[56] References Cited

U.S. PATENT DOCUMENTS

| | | | |
|---|---|---|---|
| 2,652,550 | 9/1953 | Lash | 367/16 |
| 3,531,762 | 9/1970 | Tickell | 367/17 |
| 4,323,989 | 4/1982 | Huckabee et al. | 367/12 |
| 4,404,664 | 9/1983 | Zachariadis | 367/17 |

FOREIGN PATENT DOCUMENTS

| | | | |
|---|---|---|---|
| 0018053 | 10/1980 | European Pat. Off. | 367/12 |
| 0826932 | 1/1960 | United Kingdom | 181/118 |

*Primary Examiner*—Nelson Moskowitz
*Attorney, Agent, or Firm*—Thomas G. Devine; James T. Comfort; Melvin Sharp

[57] ABSTRACT

A bi-planar pontoon paravane is towed by a marine vessel and controls the depth and position of a towed seismic source array. The bi-planar pontoon paravane is made up of a buoyant bridge with right and left wings attached to the long sides of the bridge, the wings projecting into the water and, in concert, providing a side force. The paravane is towed by a tow line connected to an adjustable bridle which in turn is connected to the paravane. Remote adjustment of the bridle is provided by an hydraulic valve on the vessel controlling an hydraulic motor and gear arrangement on the paravane to adjust the bridle. Adjustment of the bridle adjusts the angle of attack of the paravane. The paravane provides a housing formed below the bridge and between the two wings for housing the seismic source array. A boom on the vessel is attached to the seismic source array, through the bridge, when the assembly is to be placed in or removed from the water. To remove the assembly, the boom pulls the seismic source array until it enters the housing and then lifts both the seismic source array and the paravane out of the water. Placing the assembly in the water is simply the reverse with the seismic source array being supported by the paravane at a desired depth by action of a locking mechanism in the paravane. A nose plane is positioned in the front of the paravane, below the bridge and between the right and left wings and angled relative to the horizontal to minimize diving of the paravane.

11 Claims, 5 Drawing Figures

BI-PLANAR PONTOON PARAVANE SEISMIC SOURCE SYSTEM

This is a continuation of application Ser. No. 622,307, filed June 19, 1984 and now abandoned.

BACKGROUND OF THE INVENTION

1. Field of the Invention

This invention relates to paravanes for depth and directional positioning of towed seismic source arrays and particularly to a bi-planar pontoon paravane having a pair of wings for directing the flow of water to provide side forces.

2. Description of the Prior Art

In hydrographic seismic surveys over oceans, the state of the art is to tow seismic sources (air-guns) outboard of the towing vessel. Some type of paravane is necessary to apply a force perdendicular to the direction of the vessel's travel and in a plane parallel with the surface of the ocean. This results in the air-gun source arrays being 50 meters to 100 or more meters wide behind the vessel. Configuring in two parallel lines enables graphing two seismic lines at the same pass by shooting guns alternately in their wide-spread configuration behind the vessel, thus cutting survey time and cost in half, and to allow for more than two strings to be towed behind the vessel. Also, by spacing a plurality of paravanes in a geometric pattern, side noise may be attenuated. To be effective for this use, the paravane must have some flotation to maintain the paravane at the surface or a specific depth below the surface.

Commercial fishermen and shrimp boat operators have used paravanes for years to pull their nets outboard of their boats. Their paravanes take the form of simple boards called doors, or otterboards, which have a chain or rope bridle. These types of paravanes are too small to pull the heavy pressure-vessel type of air guns used in the seismic industry and would not withstand the seismic pulses.

United States Navy mine sweeper vessels have employed more sophisticated paravanes with four "air foils" made of formed sheet metal with the sides joined into the classic "box plane". These paravanes provide enough pull for seismic work, but are unwieldy in requiring three separate components to be used: a 500 pound paravane, a 900 pound steel or fiberglass float and the air-gun array itself, which weighs some 5,000 pounds. With this type of paravane, the air-gun arrays still have to be supported by round buoys that create a large drag force.

Another prior art paravane is a long, slender V shaped pontoon that serves as a paravane by its surface area and supports the array of air-guns as well.

Still another prior art paravane looks like a section of an actual airplane wing which is turned on its side. Lead is put in the bottom "tip" of the wing, and the top cavity serves as abuoyancy chamber to maintain the sideways orientation of the paravane. This type paravane tends to speed up, slow down, and jump out of the water at times due to nearly neutral buoyancy.

Still another prior art device is a cylindrical steel pontoon having a steerable wing on the front which steers the pontoon outboard of the ship. This particular prior art device is very large and in fact too large for use on the typical seismic exploration vessel.

To reduce the length of the paravane and to provide a steady, predictable side force, the biplane structure of applicant has been invented.

BRIEF SUMMARY OF THE INVENTION

The bi-planar pontoon paravane of this invention is formed of a rectangular shell filled with polyurethane foam to form a buoyant bridge structure. A wing is attached to each side of the bridge. The wings project into the water and direct the water flow to provide a side force. The side force enables pulling a seismic source array to the side, or outboard, of a towing vessel. An adjustable bridle is attached to the bi-planar pontoon paravane and a tow line is attached to the bridle. The bridle may be remotely adjusted through a motor and gearing arrangement on the paravane, controlled by a valve on the towing vessel, or it may be manually adjusted before being deployed. Adjusting the bridle results in an adjustment of the angle of attack of the paravane. The angle of attack determines the position of the paravane relative to the towing vessel. A nose plane positioned in the front of the paravane, below the bridge and between the wings. It is angled with the horizontal to prevent the paravane from diving.

The paravane is moved in and out of the water using a boom aboard the towing vessel. The boom is attached to a pair of cables which in turn are attached to the seismic source array. The cables pass through apertures in the bridge and are locked by a ring mechanism when the seismic source array is at a desired depth from the paravane. The boom is then disconnected and the tow line attached. For removing the system, the boom is reattached to the pair of lines, the seismic source array is pulled upwardly until it nests in a housing formed by the two wings and the bridge. As the boom continues to pull upwardly, the paravane is carried up along with the seismic source array.

The principal object of this invention is to provide a paravane that provides adequate side force and is of a minimum length for ease of storage aboard the towing vessel.

Another object of this invention is to provide a paravane in which the towed seismic source array may be housed and lifted out of the water together with the seismic source array.

Still another object of this invention is to provide a paravane whose angle of attack may be remotely controlled.

These and other objects will be made evident in the detailed description that follows.

DETAILED DESCRIPTION OF THE INVENTION

Figure 1:
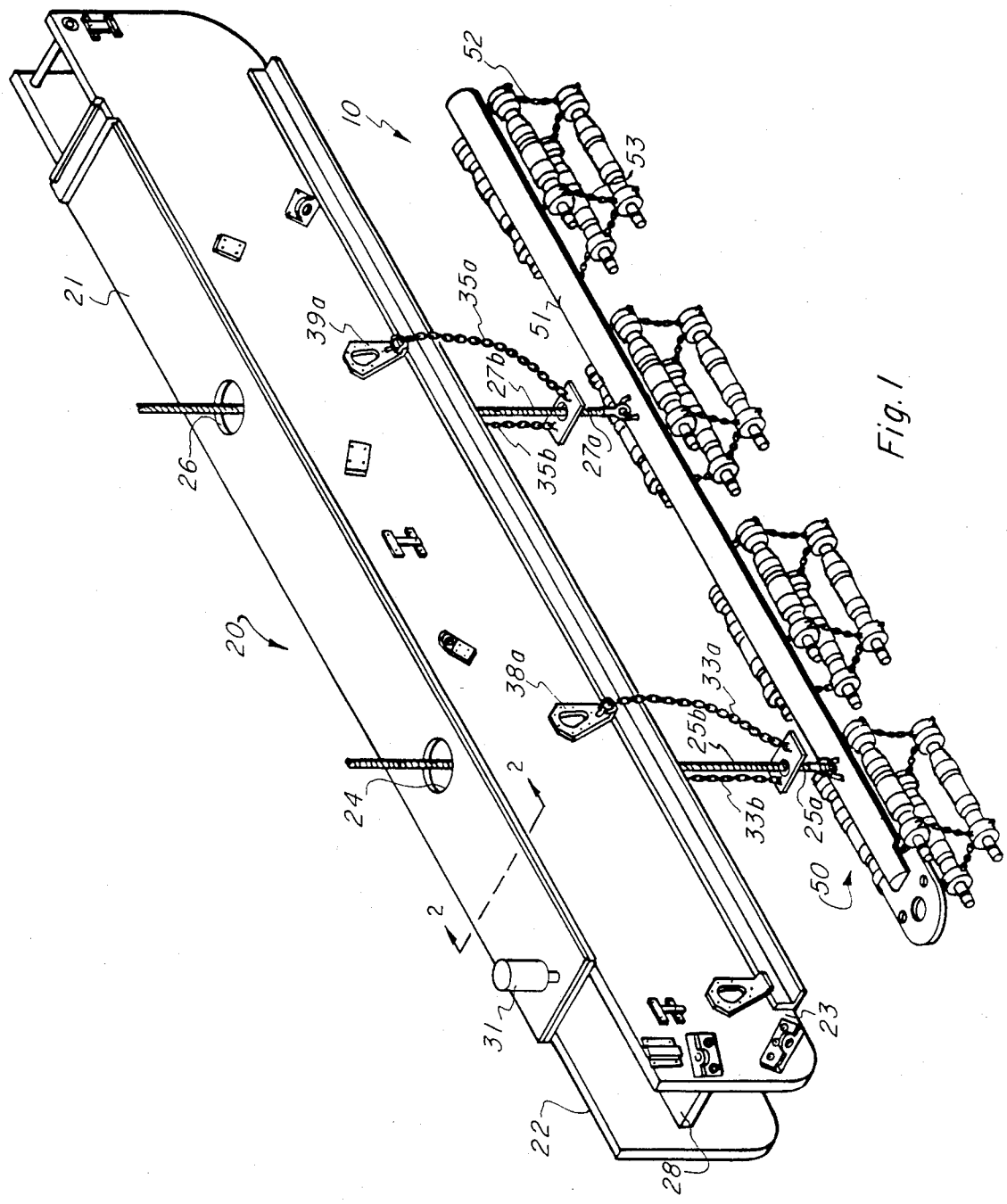
FIG. 1 is a perspective view of the bi-planar pontoon paravane supporting a seismic source array.

FIG. 1 illustrates the seismic source system 10 which is comprised generally of bi-planar pontoon paravane 20 and seismic source assembly 50. Seismic source assembly 50 is suspended from paravane 20 by cables 25a and 27a.

Figures 2, 3:
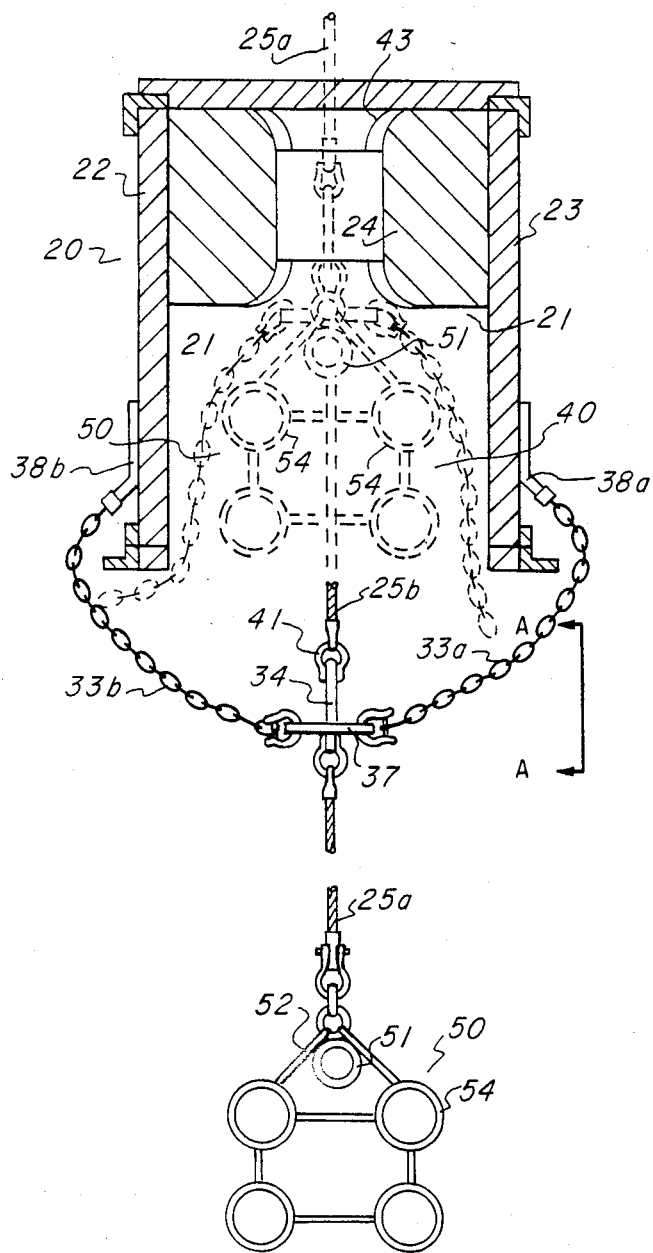
FIG. 2 is a section taken of the paravane as indicated in FIG. 1.
FIG. 3 is a side view of a portion of FIG. 2.

Paravane 20 is made up of buoyant bridge 21 to which are attached right and left wings 22 and 23, respectively. This configuration provides a side force of about 1.5 times that of a single wing paravane that is twice the length of the bi-planar pontoon paravane of this invention. In this preferred embodiment, the bi-planar pontoon paravane is approximately thirty feet long. A mast socket 31 receives an aluminum mast (not shown) having a target covered with reflective tape to be used with a laser range-finder to locate the paravane. Chains 33a and 35a are supported by air-gun support plates 38a and 39a, respectively. Chains 33b and 35b are supported on the right wing 22 by air-gun support plates 38b (see FIG. 2) and 39b (not shown). Ring 34 is connected to cable 25b and ring 37 is connected to cables 33a and 33b as shown in FIGS. 2 and 3. An identical arrangement is provided for cable 27b. Ring 34 is connected through bracket 41 to the end of cable 25b. The lengths of cables 25a and 25b are selected so that rings 34 and 37 engage each other when the seismic source array 50 is at its desired depths. Cables 25b and 27b pass through apertures 24 and 26, respectively. For placement into the water and removal from the water, cables 25b and 27b are connected to a boom that is located aboard the towing vessel. The boom is not part of this invention and the vessel could be provided with a "cherry picker" or the like to move the assembly in and out of the water.

In FIG. 1, the seismic source array 50 is shown being made up of air-gun support 51 with linking supports 52 and 53 supporting air-guns 54. Only one air-gun is so numbered, but it should be understood that the air-guns are all configured in generally the same manner with varying numbers as desired. In this preferred embodiment, 17 air-guns are supported by paravane 20. The size of the air-gun and the engineering design, of course, dictates the number to be used.

FIG. 2 is a cross section taken through FIG. 1 where indicated and illustrates the seismic source array 50 shown extended into the water, and also within chamber 40 of paravane 20 in the retracted position, having been pulled upwardly by the boom connected to cables 25b and 27b. Obviously, as shown in the retracted position, continued lifting by the boom results in the seismic source array 50 being lifted, contacting chains 33a, 33b, and 35a, 35b. This results in paravane 20 being lifted.

FIG. 3 is a side view of the depth rings 34 and 37.

Figure 4:
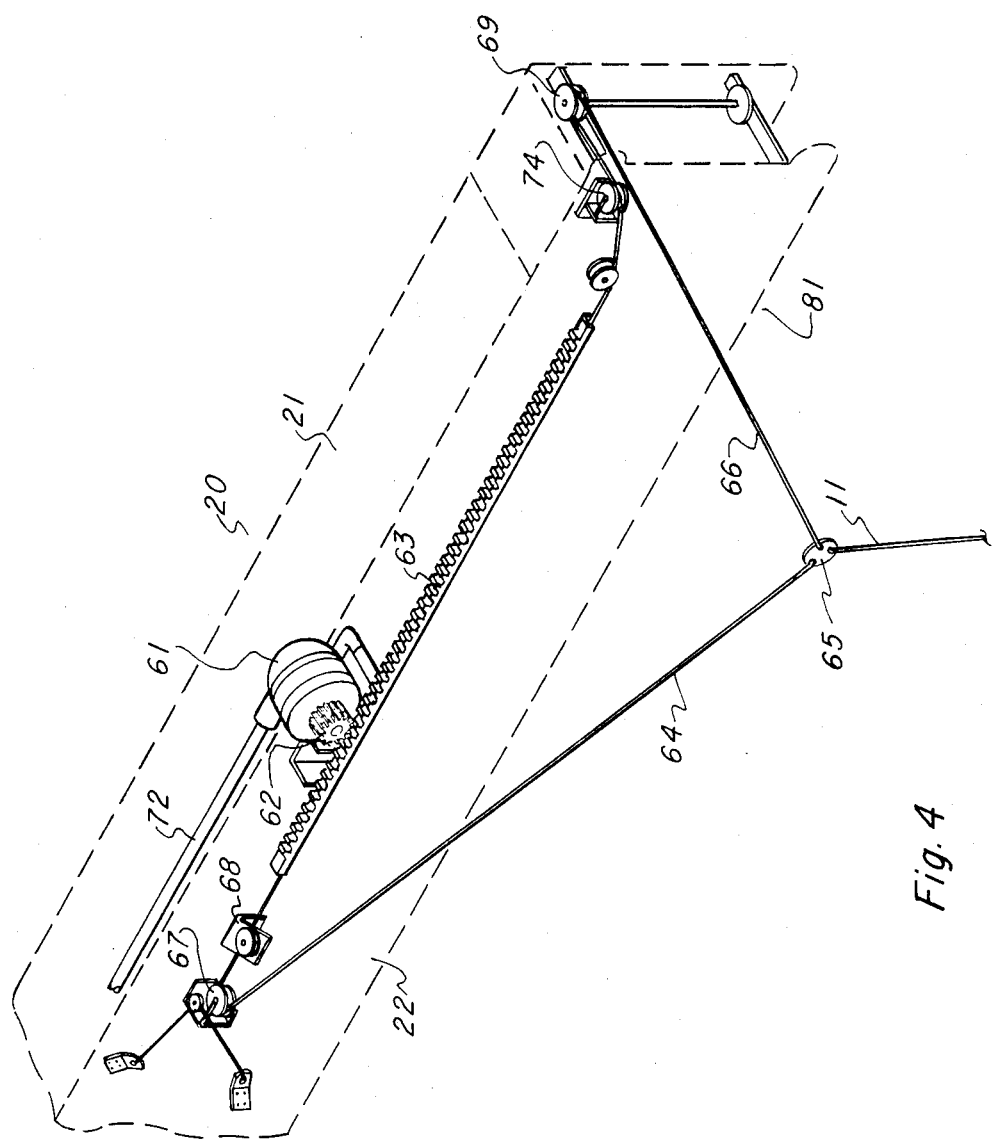
FIG. 4 is a partially phantom perspective view illustrating the bridle adjustment mechanism.

FIG. 4 illustrates the adjustable bridle 81 attached, in this instance, to the right wing 22 and to the front of the paravane 20. The bridle is positioned at the center of pressure to avoid rotation of the paravane. In this preferred embodiment, hydraulic motor 61 drives pinion gear 62. The hydraulic fluid is supplied through line 72 which is returned to the towing vessel 80 with tow line 11. Motor 61, in this preferred embodiment, is manufactured by HPI Nichol, Model 123-X-HS-1 hydraulic wheel motor. The motor of course could be any suitable hydraulic motor. Alternatively, an air motor, an air cylinder or an hydraulic cylinder, for example, could be used. A valve aboard the vessel is used to control the direction and weight of hydraulic fluid flow to the motor. The particular valve selected for use in this application is a Racine hydraulic valve, Model ML-15. Any suitable valve, of course, may be employed.

Rack 63 is engaged by pinion gear 62. When rack 63 moves to the left, line 66 of the bridle is pulled to the right and line 64 is also pulled to the right causing the tow point 65 to move closer to the front of paravane 20. If the rack is moved in the other direction, the opposite result occurs. Fixed point 65 is either brought closer to the front of paravane 20 or closer to the rear. Tow line 11 is connected to the towing vessel.

Line 64 rides on idler pulley 67, through aperture 68 for connection to rack 63. Line 66 rides on idler pulley 69 and through aperture 74 for connection to rack 63 which completes the loop.

MODE OF OPERATION

Figure 5:
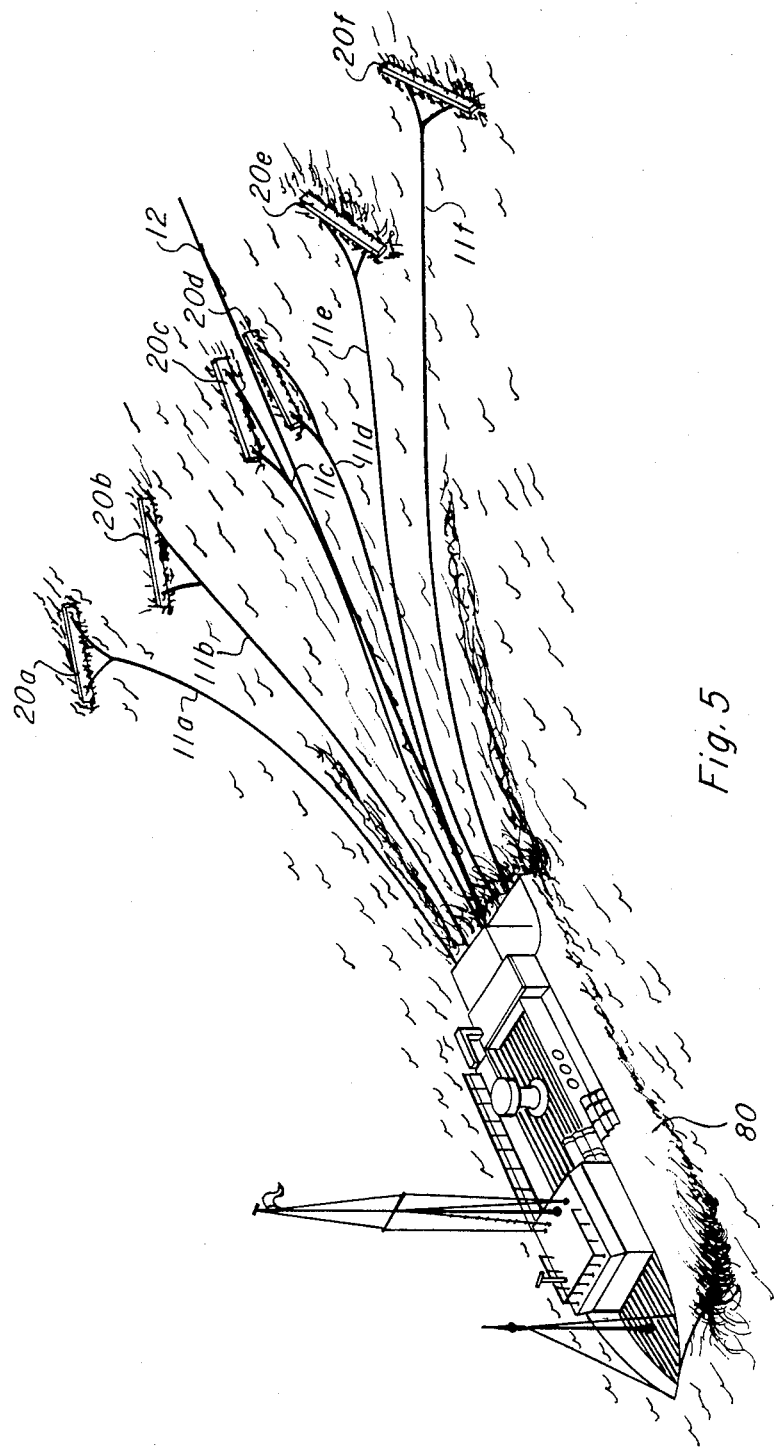
FIG. 5 is a perspective of the towing vessel towing six of the bi-planar pontoon paravanes of this invention, together with a seismic streamer.

Please refer to all of the figures. Assume that bi-planar pontoon paravane 10 is aboard vessel 80 (FIG. 5). Lines 25b and 27b are wound up on winches associated with the boom aboard vessel 80. The winches and boom are not part of the invention and are not shown. The seismic source array 50 is in position within housing 40 of paravane 20. The boom lifts the entire assembly 10 off the deck out over the water at which time the winches are turned to lower the assembly 10 into the water. The winches continue to turn, permitting the seismic source array 50 to descend into the water until ring 34 engages ring 37 (FIGS. 2 and 3). The rings (not shown) associated with chains 35a and 35b also are engaged. At that point, chains 33a, 33b, and 35a, 35b support the seismic source array 50. The boom is disconnected and the assembly 10 is towed. FIG. 5 shows a plurality of paravanes 20a–20f being towed by vessel 80 via lines 11a–11f. In FIG. 5, a seismic streamer 12 is shown in position. Streamer 12 has hydrophones attached for receiving seismic signals resulting from exitation of the seismic source arrays. It is contemplated that a single paravane may tow one or more other paravanes having seismic source arrays attached.

If it is desired to change the angle of attack of any of paravanes 20a–20f, the valve for the particular paravane aboard vessel 80 is activated to cause hydraulic fluid to flow in the desired direction and at the desired rate to move bridle 81 as described earlier. The paravane is thus moved further in or out in a direction orthogonal to the path of vessel 80, as desired.

When the survey has been completed, the paravane 20 is brought back to vessel 80 and lines 25b and 27b are again connected to be wound on the winches of the boom. As the winches wind the lines, array 50 moves up into compartment 40 of paravane 20. As the winches continue to wind, the entire assembly 10 is then lifted up and brought aboard by the boom which then lowers the assembly to a desired position on the deck of the vessel 80.

Those skilled in the art may make design changes to this invention, for instance in numbers of air-guns, using water guns instead of air-guns, the manner of supporting the air-guns, and the number of cables to pull the air-guns, all without departing from the scope of this invention which is defined by the appended claims.

What is claimed is:

1. A seismic source system for towing by a marine vessel equipped with a lifting mechanism, comprising:
    (a) a seismic source array, selectively attachable to the lifiting mechanism; and
    (b) a bi-planar pontoon paravane for housing and supporting the seismic source array, the paravane comprising:
        (i) a buoyant bridge having two long sides;
        (ii) housing means including the bridge for housing the seismic source assembly when the lifting mechanism is attached and activated to lift the seismic source array; and (iii) means responsive to a first predetermined condition of said lifting mechanism for suspending the seismic source array a desired distance beneath the paravane and responsive to a second predetermined condition of said lifiting mechanism for moving said seismic source array into said housing means.

2. The system of claim 1 wherein the seismic source array comprises a plurality of air guns and air gun support means for positioning the air guns.

3. The system of claim 2 wherein the air gun support means is selectively attachable to the lifting mechanism so that when the lifting mechanism is attached and activated, the air gun support means contacts the underside of the buoyant bridge between the right and left wings and thereby causes the bi-planar pontoon paravane to be lifted along with the seismic source array.

4. A seismic source system for towing by a marine vessel equipped with a bi-directional fluid valve comprising:

(a) a seismic source array connected to the valve;

(b) a bi-planar pontoon paravane for housing and supporting the seismic source array, the paravane comprising:

(i) a buoyant bridge having two long sides;

(ii) adjustable bridle means connected to the bridge for towing attachment to the marine vessel; and (iii) a bidirectional controllable fluid line coupled to said adjustable bridle means for adjusting the angle of attack of said paravane.

5. The system of claim 4 further comprising motive means connected to adjust the adjustable bridle.

6. The system of claim 5 wherein the motive means comprises an hydraulic motor mounted in the paravane, gear means driven by the motor and connected at each end to the adjustable bridle to adjust the length of the bridle from each end for adjusting the angle of attack of the paravane.

7. The system of claim 6 wherein the gear means comprises a pinion gear driven by the hydraulic motor, a rack, positioned longitudinally of the length of the paravane, and at least one pulley positioned at each end of the rack for permitting movement of the adjustable bridle when the rack moves in either direction.

8. The system of claim 6 wherein the hydraulic motor is actuated by operation of the hydraulic valve.

9. The system of claim 7 wherein the hydraulic motor is actuated by operation of the hydraulic valve.

10. The seismic source system of claim 1, further including a right wing attached to one long side of the bridge, projectable into the water for providing side force and a left wing attached to the other long side of the bridge, projectable into the water for providing side force in concert with the right wing, said housing means being formed between the bridge and the left and right wings.

11. The seismic source system of claim 3, further including a right wing attached to one long side of the bridge, projectable into the water for providing side force and a left wing attached to the other long side of the bridge, projectable into the water for providing side force in concert with the right wing, said housing means being formed between the bridge and the left and right wings.

* * * * *